United States Patent
Du et al.

(10) Patent No.: US 8,934,894 B2
(45) Date of Patent: Jan. 13, 2015

(54) REAL-TIME NETWORK SELECTION AND MOBILE SUBSCRIBER IDENTITY UPDATE FOR INTER-STANDARD NETWORK ROAMING

(75) Inventors: Zhimin Du, Beijing (CN); Yan Li, Beijing (CN); Jiming Guo, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 340 days.

(21) Appl. No.: 12/605,943

(22) Filed: Oct. 26, 2009

(65) Prior Publication Data

US 2010/0136967 A1    Jun. 3, 2010

Related U.S. Application Data

(60) Provisional application No. 61/109,177, filed on Oct. 28, 2008, provisional application No. 61/159,082, filed on Mar. 10, 2009, provisional application No. 61/159,440, filed on Mar. 11, 2009.

(51) Int. Cl.
*H04W 4/00*     (2009.01)
*H04W 8/20*     (2009.01)
(Continued)

(52) U.S. Cl.
CPC ............... *H04W 8/205* (2013.01); *H04W 8/12* (2013.01); *H04W 8/26* (2013.01); *H04W 88/06* (2013.01); *H04W 88/16* (2013.01)
USPC ..................... 455/432.3; 455/432.1; 455/434; 455/435.1; 455/433; 370/329; 370/352

(58) Field of Classification Search
USPC ........................................... 455/432.3, 432.1
See application file for complete search history.

(56) References Cited

U.S. PATENT DOCUMENTS 6,603,761 B1    8/2003 Wang et al.
6,684,073 B1 *  1/2004 Joss et al. ................... 455/433
(Continued)

FOREIGN PATENT DOCUMENTS

CN       1717946 A      1/2006
CN       1767690 A      5/2006
(Continued)

OTHER PUBLICATIONS

International Search Report & Written Opinion—PCT/US2009/062281, International Search Authority—European Patent Office—Mar. 24, 2010.

(Continued)

*Primary Examiner* — Timothy Pham
(74) *Attorney, Agent, or Firm* — Won Tae Kim

(57) ABSTRACT

A method for inter-standard network roaming is provided. Upon roaming into a visited network, an access terminal may send a location update message that includes its current mobile subscriber identity. A roaming gateway receives the update message and uses the current mobile subscriber identity to determine whether the access terminal should be assigned a new mobile subscriber identity for operation in the visited network. If the current mobile subscriber identity indicates that the access terminal is not using a preferred roaming sponsor for the visited network, then the roaming gateway generates or selects a new mobile subscriber identity associated with the preferred roaming sponsor. The new mobile subscriber identity is securely transmitted to the access terminal which uses it for communications over the visited network thereafter.

40 Claims, 8 Drawing Sheets

(51) Int. Cl.
    *H04L 12/66* (2006.01)
    *H04W 8/12* (2009.01)
    *H04W 8/26* (2009.01)
    *H04W 88/06* (2009.01)
    *H04W 88/16* (2009.01)

(56) References Cited

U.S. PATENT DOCUMENTS

| | | |
|---|---|---|
| 7,047,008 B2 | 5/2006 | Martlew |
| 2002/0119774 A1 | 8/2002 | Johannesson et al. |
| 2002/0197991 A1 | 12/2002 | Anvekar et al. |
| 2004/0072578 A1* | 4/2004 | Keutmann et al. ......... 455/456.1 |
| 2004/0176092 A1 | 9/2004 | Heutschi |
| 2005/0192035 A1* | 9/2005 | Jiang ............................ 455/461 |
| 2006/0094423 A1 | 5/2006 | Sharma et al. |
| 2006/0205404 A1* | 9/2006 | Gonen et al. ............... 455/432.1 |
| 2006/0205434 A1* | 9/2006 | Tom et al. ..................... 455/558 |
| 2006/0276226 A1* | 12/2006 | Jiang ............................ 455/558 |
| 2007/0249338 A1 | 10/2007 | Schwalb |
| 2007/0281687 A1* | 12/2007 | Jiang ............................ 455/433 |
| 2010/0128685 A1* | 5/2010 | Jiang ............................ 370/329 |

FOREIGN PATENT DOCUMENTS

| | | |
|---|---|---|
| CN | 1266978 C | 7/2006 |
| CN | 101223804 A | 7/2008 |
| WO | WO02104062 A1 | 12/2002 |

OTHER PUBLICATIONS

Taiwan Search Report—TW098136569—TIPO—Nov. 29, 2012.

* cited by examiner

REAL-TIME NETWORK SELECTION AND MOBILE SUBSCRIBER IDENTITY UPDATE FOR INTER-STANDARD NETWORK ROAMING

CLAIM OF PRIORITY UNDER U.S.C. §119

The present Application for Patent claims priority to U.S. Provisional Application No. 61/109,177 entitled "Method to Update GSM Element File in Dual Mod R-UIM/SIM Card", filed Oct. 28, 2008, U.S. Provisional Application No. 61/159, 082 entitled "Real-Time Network Selection for CDMA/GSM Dual Mode Card Using IMSI", filed Mar. 10, 2009, and U.S. Provisional Application No. 61/159,440 entitled "Real-Time Network Selection for CDMA/GSM Dual Mode Card Using IMSI", filed Mar. 11, 2009, all of which are assigned to the assignee hereof and hereby expressly incorporated by reference herein.

BACKGROUND

1. Field

One feature relates to roaming in different communication systems, and more particularly, to a way to select and/or update a roaming sponsor for a mobile device in a visited serving wireless network.

2. Background

In wireless communications, a core wireless network is managed by a core network operator to provide wireless service to subscriber wireless access terminals within the coverage area of the core wireless network. In order to allow the subscriber wireless access terminals to operate in regions outside the core wireless network (e.g., in regions served by other wireless networks), the core network operator may enter into roaming agreements with the operator(s) of those other wireless networks. Typically, a core network operator may enter into roaming agreements with visited network operators for visited wireless networks implementing the same or compatible communication technologies as the core wireless network. This allows subscriber wireless terminals of the core (home) wireless network to easily roam to other (visited) networks while allowing the core wireless network to perform roaming related authentication, mobile terminated services, bill settlement, etc., as the core wireless network and visited wireless network utilize the same or compatible communication protocols. In such typically implementations, the subscriber wireless access terminal may be a single mode terminal (e.g., able to communicate with just a single type of network).

However, despite such roaming agreements with operators of other compatible networks, a subscriber wireless access terminal may find itself in a region not covered by a network having the same or compatible communication protocols as the core wireless network. For instance, competing wireless communication networks often implement different communication standards. In some cases, a wireless access terminal that typically communicates over networks using a first communication standard may enter a region being served by a wireless communication network that operates on a different second communication standard. Thus, a user that normally gets services from a first type of network (e.g., using a first communication standard) at home (e.g., home network) may seek to get services from a second type of network (e.g., using a second communication standard) when the user travels abroad or to a different region. To this end, the user may use a dual-mode access terminal or temporally use another access terminal that supports the second type of communication standard.

In such situations, a dual mode card coupled to or inserted in the wireless access terminal may be configured to permit Code Division Multiple Access (CDMA)-to-Global System for Mobile Communication (GSM) or Wide Code Division Multiple Access (WCDMA) inter-standard roaming. The dual mode card (such as R-UIM (Removable User Identity Module)/SIM (Subscriber Information Module cards)) may be used by the wireless access terminal (e.g., mobile device, mobile equipment, mobile phones, access terminals, etc.) to facilitate roaming between different types of wireless communication networks. In one example, the Removable User Identity Module (R-UIM) is a card developed for CDMA access terminals that can also act as a GSM SIM card for GSM access terminals (either GSM-only or CDMA/GSM dual-mode) and networks, thereby allowing a user to get services from a GSM or WCDMA network in regions where there is no CDMA coverage. In addition to information for the CDMA network, the dual mode card also includes or maintains a GSM directory that provides all GSM network required identifiers and credentials, which points to a roaming sponsor in the GSM network. The roaming sponsor may be a service provider that can facilitate communications over a visited network. For example, the roaming sponsor may be a service provider that has an agreement with the operator of the visited network to use the visited network. The roaming sponsor acts as the proxy between the home service provider and the visited service provider, so that the home service provider doesn't need to negotiate and deal with individual visited service providers that use a different communication standard. The roaming sponsor allows an out-of-network access terminal to obtain communication services via the visited network. Since the roaming sponsor may be changed from time to time, a solution to update the GSM International Mobile Subscriber Identity (IMSI) in a dual mode card directory over-the-air (OTA) is needed. In particular, where multiple roaming sponsors are available in a particular region, it may be advantageous to utilize one roaming sponsor over another.

Therefore, an update mechanism is needed that allows selection of one roaming sponsor over another in the region of a particular visited serving network.

SUMMARY

Techniques for facilitating inter-standard roaming of access terminal are provided using a roaming sponsor.

According to one feature, a roaming gateway and method operational therein are provided for facilitating inter-standard network roaming. A location update message may be received by the roaming gateway from an access terminal in a visited network. The roaming gateway then determines whether a current roaming sponsor for the access terminal is a preferred roaming sponsor in the visited network. A new mobile subscriber identity is then obtained for the access terminal if the current roaming sponsor is not the preferred roaming sponsor, where the new mobile subscriber identity is associated with the preferred roaming sponsor. The roaming gateway then sends the new mobile subscriber identity to the access terminal so that it can establish wireless service in the visited network using the preferred roaming sponsor.

The location update message may include a currently activated mobile subscriber identity for the access terminal. The new mobile subscriber identity may be obtained if the currently activated mobile subscriber identity is not associated with the preferred roaming sponsor for the visited network.

The roaming gateway may determine whether the access terminal is using the preferred roaming sponsor for the visited network based on the currently activated mobile subscriber identity. Additionally, the roaming gateway may determine whether the access terminal is using the preferred roaming sponsor based on at least one of a currently serving visitor location register identity or a mobile switching center identity.

In one example, the new mobile subscriber identity may be associated with a network type and a mobile subscriber identity number. In another example, the new mobile subscriber identity may be an international mobile subscriber identity (IMSI). The visited network may implement a different communication standard than a home network for the access terminal.

The preferred roaming sponsor may be selected from a plurality of available roaming sponsors in the visited network. In one example, the preferred roaming sponsor may have a pre-established roaming agreement with a home service provider for the access terminal.

The new mobile subscriber identity may be sent in an update message via a short message service. The new mobile subscriber identity in the update message may be secured by at least one of either a pre-established authentication key or derived key. The update message may include instructions to change a currently activated mobile subscriber identity for the access terminal.

In response to sending the new mobile subscriber identity, the roaming gateway may receive an acknowledgment message from the access terminal indicating that the new mobile subscriber identity has been accepted by the access terminal. The roaming gateway then associates the access terminal with the new mobile subscriber identity.

According to another feature, an access terminal and method operational therein are provided for facilitating inter-standard network roaming. The access terminal may send a location update message upon roaming into a visited network, wherein the access terminal is associated with a current roaming sponsor in the visited network. The location update message may include a currently activated mobile subscriber identity for the access terminal.

In response to the location update message, the access terminal may receive a new mobile subscriber identity associated with a preferred roaming sponsor in the visited network if the current roaming sponsor is not the preferred roaming sponsor. A roaming sponsor is one of either a service provider in the visited network or a third party that has a roaming agreement with the service provider in the visited network. The new mobile subscriber identity may be associated with a network type and a mobile subscriber identity number. The new mobile subscriber identity may be received in an update message from a roaming gateway, and the update message includes instructions to change to the new mobile subscriber identity. The visited network may implement a different communication standard than a home network for the access terminal. The new mobile subscriber identity may be received in an update message from a roaming gateway and the new mobile subscriber identity is secured with at least one of either a pre-established authentication key or a derived key for the access terminal.

The access terminal may then update a dual mode card for the access terminal with the new mobile subscriber identity. For example, the access terminal may send the new mobile subscriber identity to the dual mode card for the access terminal. In response, the access terminal may receive a signal from the dual mode card indicating to reset the access terminal to operate with the new mobile subscriber identity.

The access terminal may also send an acknowledgement message indicating that the access terminal has been updated with the new mobile subscriber identity. Wireless service may then be established by the access terminal via the visited network using the new mobile subscriber identity.

DETAILED DESCRIPTION

Figure 1:
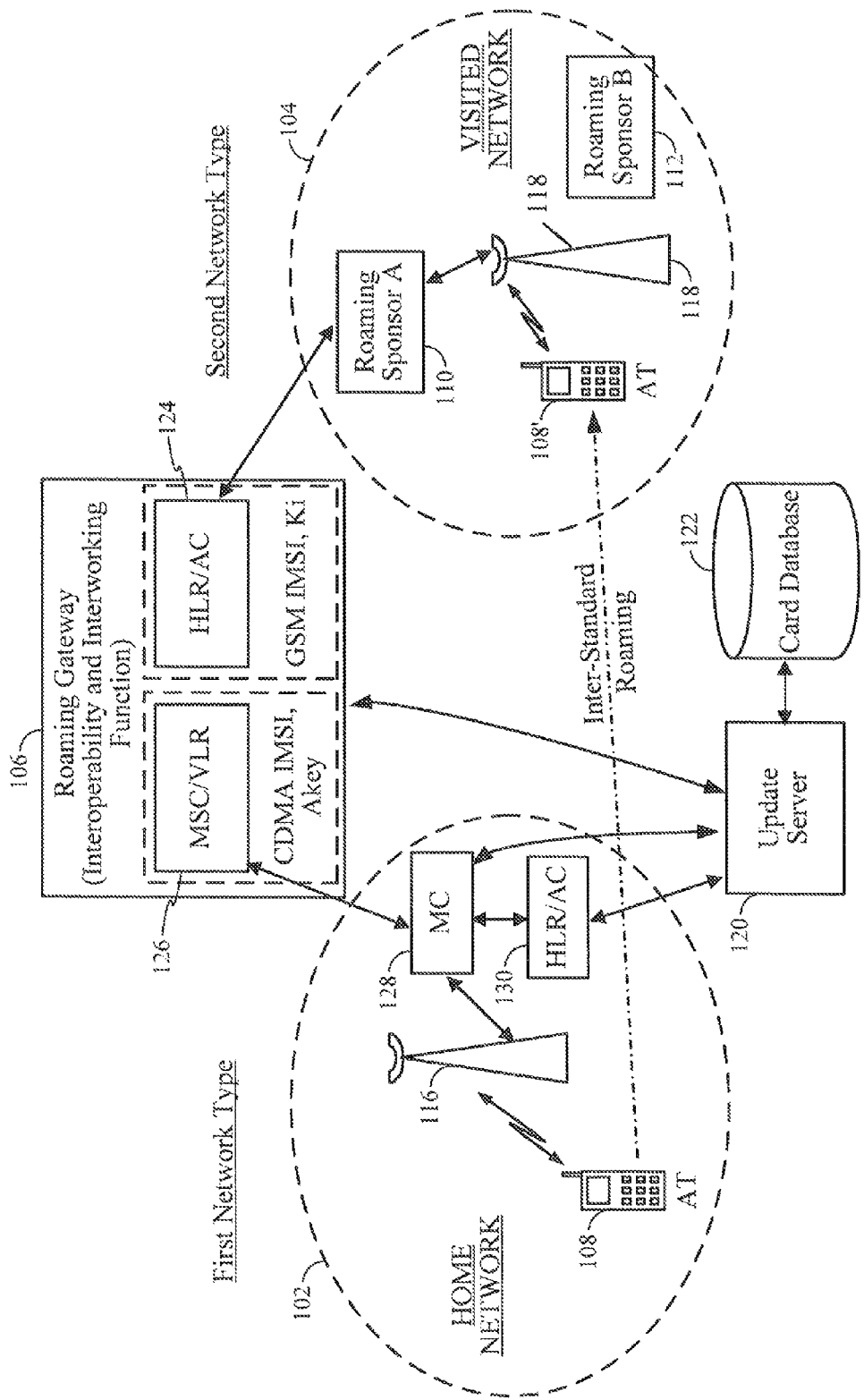
FIG. 1 illustrates a multi-network environment in which a dual mode roaming access terminal may operate.

In the following description, specific details are given to provide a thorough understanding of the embodiments. However, it will be understood by one of ordinary skill in the art that the embodiments may be practiced without these specific details. For example, circuits may be shown in block diagrams, or not be shown at all, in order not to obscure the embodiments in unnecessary detail. In other instances, well-known circuits, structures and techniques may not be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Overview

According to one feature, a technique is provided that allows selection and update of a roaming sponsor for inter-standard network roaming by an access terminal. In one instance, a home network operator may select a preferred roaming sponsor while subscriber access terminals are operational in the home network (e.g., CDMA network). The home network operator then updates its subscriber access terminals with a new mobile subscriber identity (e.g., IMSI) associated with the preferred roaming sponsor which is to be used when a subscriber access terminal visits a different type of network (e.g., WCDMA network or GSM network) where the preferred roaming sponsor is a service provider. In this manner, the home network operator may change preferred roaming sponsors while its subscriber access terminals operate in the home network.

In another instance, a subscriber access terminal may already be operating in a visited network using a currently active mobile subscriber identity (e.g., first IMSI) associated with a first roaming sponsor. However, the home network operator may prefer that a second roaming sponsor be used instead. Therefore, the home network operator may cause the subscriber access terminal to change to a new mobile subscriber identity (e.g., second IMSI). Upon roaming into a visited network, the access terminal may send a location update message that includes the currently active mobile subscriber identity. A roaming gateway receives the update message and uses the currently active mobile subscriber identity to determine whether the access terminal should be assigned a new mobile subscriber identity (associated with the preferred second roaming sponsor) for operation in the visited network. If the currently active mobile subscriber identity indicates that the access terminal is not using the preferred second roaming sponsor for the visited network, then the roaming gateway generates and/or sends a new mobile subscriber identity (e.g., second IMSI) associated with the preferred second roaming sponsor. The subscriber access terminal updates to use the new mobile subscriber identity and switches to use the preferred second roaming sponsor.

The operator of the visited network recognizes the new mobile subscriber identity as belonging to the preferred second roaming sponsor. The preferred second roaming sponsor knows that the new mobile subscriber identity is associated with a subscriber access terminal of the home network, and forwards or relays certain requests to the operator of the home network. Note that, as the subscriber access terminal roams in different regions, this IMSI update process may be repeated so that it uses a preferred roaming sponsor in each region.

Exemplary Network Environment

FIG. 1 illustrates a multi-network environment in which a dual mode roaming access terminal may operate. In this example, a home network 102 (e.g., first network) and a visited network 104 (second network) are illustrated, where each network may implement different communication protocols (e.g., the home and visited networks are different network types) to provide wireless services to one or more access terminals 108. Each network 102 and/or 104 may include one or more access points 116 and 118 (e.g., base stations, etc.) that allow access terminals to communicate over each respective network.

In one example, the home network 102 may include a Message Center 128 (MC) that may direct messaging to/from the access point 116. Additionally, a Home Location Register (HLR) and/or Authentication Center (AC) 130 may be coupled to the Message Center 128 and provides location registry and authentication services to the home network. In one example, the MC 128 and HLR/AC 130 may be compliant with the ANSI-41 Standard for Cellular Radio telecommunications Intersystem Operations. The access terminal 108 may be subscribed with the operator of the home network 102 but may roam into the visited network 104. The access terminal 108 may be, for example, a mobile phone, wireless communication device, a cellular phone, etc. Serving roaming subscribers (e.g., access terminals) is challenging even when the visited network 104 and the home network 102 employ identical technologies.

A home network operator may typically sign a roaming agreement with another network operator of a visited network that uses the same communication technology or protocol as the home network. This allows subscriber access terminals of the home network to easily connect to the visited network when roaming and allows the home network to perform authentication, mobile terminated services, bill settlement, etc., for the roaming access terminals. In such cases, the access terminals can be single mode terminals and the roaming can be bidirectional.

However, where the visited network 104 implements a different protocol (e.g., wireless interface and/or call model technology) than that implemented by the home network 102, special challenges arise in providing interworking between such networks due to fundamental differences in the protocols of the underlying networks. For example, performing authentication, billing, etc., between two networks implementing distinct protocols may be difficult. One such example is where the home network 102 is a CDMA network and the visited network 104 is a WCDMA network or a GSM network.

In order to obtain services via the visited network 104 (e.g., visited serving network implementing a different protocol than the home network 102), the access terminal 108' may rely on a roaming sponsor 110. That is, the access terminal's 108' home network operator may have an agreement with a service provider who acts as the roaming sponsor for the home network operator. The roaming sponsor may be the service provider of the visited network 104 in special cases or it has agreements with the service provider of the visited network to allow its roaming subscriber access terminal 108' to operate on the visited network 104. In the latter case, the service provider of the visited network deems that the roaming subscriber access terminal 108' comes from the roaming sponsor 110.

Figure 2:
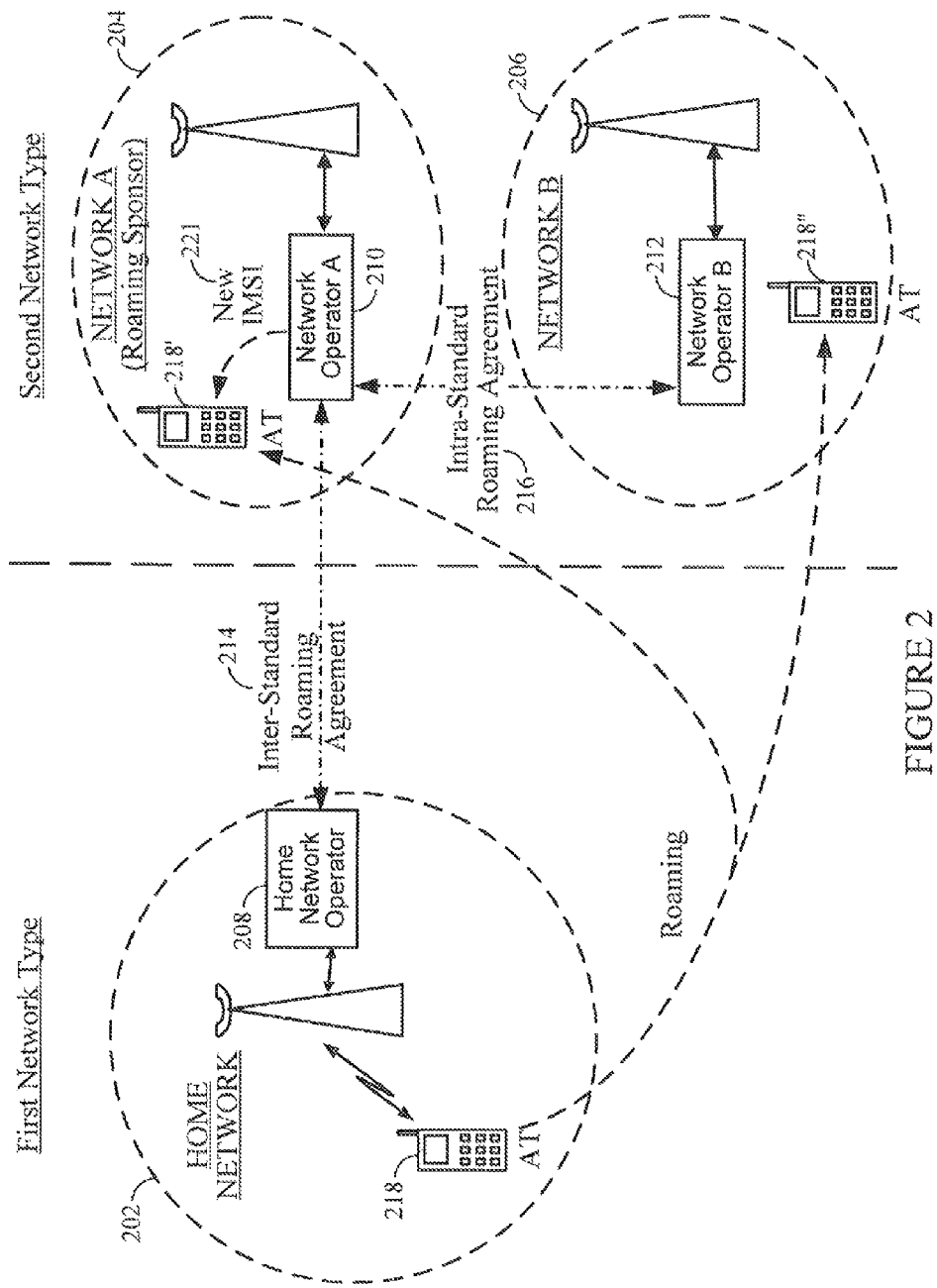
FIG. 2 is a diagram illustrating how inter-standard roaming may be implemented.

FIG. 2 is a diagram illustrating how inter-standard roaming may be implemented. A home network 202 and its operator 208, implementing a first type of communication protocol (e.g., CDMA), is illustrated. Also, a second network A 204 and third network B 206 and their corresponding operators A/B 210 and 212, implementing a second type of communication protocol (e.g., GSM), are also illustrated. One way for the home network operator 208 (e.g., CDMA network operator) to provide inter-standard roaming services to a subscriber wireless access terminal 218 that visits other networks (e.g., GSM networks) is for the home network operator 208 to enter into an inter-standard roaming agreement 214 with other network operators.

According to a first scenario, the access terminal 218' roams into network A 204. The home network operator 208 may have entered into an inter-standard roaming agreement with network operator A 210 so that the subscriber access terminal 218' may obtain service when it roams into the network A 204 (e.g., a GSM network). In this example, the network operator A 210 acts as the roaming sponsor for the access terminal 218'. The subscriber access terminal 218' may be given a new IMSI 220 (or inter-standard IMSI) while operating in the visited network A 204.

According to a second scenario, the access terminal 218" may instead roam into network B 206. The network operator A 210 may have obtained an intra-standard roaming agreement 216 with the operator B 212 of network B 206. In such case, if the subscriber access terminal 218" roams into network B 206, it is recognized as a subscriber of network A 204 (due to its use of the IMSI 220 associated with network A 204). Because a roaming agreement 216 has been established between network A 204 and network B 206, the access terminal 218" is granted access to the network B 206. In this case, the network operator A 210 acts as the roaming sponsor for the subscriber access terminal 218" while it roams in network B 206. The roaming sponsor (network operator A 210) acts as a proxy between the home network operator 208 and the serving network operator (operator B 212).

Note that a roaming sponsor may be any party, entity, and/or network operator that has obtained privileges to provide wireless services over the visited serving network. Consequently, a roaming sponsor may be a service provider on the visited network that is able to facilitate communication services over the visited network for roaming subscriber access terminals from other networks.

Continuing with FIG. 2, in an intra-standard roaming agreement, a group of IMSIs may be assigned or allocated to network operator A 210 which it can use for its access terminals or sponsored access terminals. For instance, the new IMSI 220 assigned to the access terminal 218' may be from the group of IMSIs assigned to the network operator A 210. As far as network B 206 is concerned, access terminal 218" is a subscriber of network A 204 since it has an IMSI associated with network operator A 210. However, network operator A 210 knows that the new IMSI is associated with roaming subscriber access terminals of the home network operator 208 and can therefore route certain operations (e.g., location update, authentication, billing, etc.) to the home network 202. Thus, in this example, network operator A 210 acts as the roaming sponsor for subscriber access terminals of the home network 202.

Referring again to FIG. 1, the access terminal 108 may include a dual mode transceiver and a dual mode card which permits it to operate in different types of networks (e.g., CDMA, WCDMA and/or GSM, etc.). The dual mode card may store information (e.g., network information, IMSI information, etc.) for each of the networks supported by the access terminal and dual mode transceiver. For example, the access terminal 108 may typically operate in the home network 102 (e.g., a CDMA network) but moves or roams into the visited network 104 (e.g., a GSM network). Since the visited network 104 implements a different communication protocol than the home network 102, the access terminal 108' (e.g., its dual mode transceiver) recognizes the change in networks and switches to operate on the communication protocol for the visited network 104. In this example, the dual mode card may store a first IMSI for operation in the home network 102 and a second IMSI (e.g., roaming IMSI) for operation in the visited network 104. The dual mode access terminal may be dynamically provisioned or pre-provisioned with the IMSI it should use for inter-standard roaming. This inter-standard IMSI (e.g. WCDMA IMSI or GSM IMSI) may be different from the IMSI typically used by the access terminal with its home network (e.g. CDMA IMSI).

Provisioning of Roaming IMSI

A roaming subscriber access terminal may be provisioned with a new or roaming IMSI for inter-standard roaming in various ways.

According to one example, the home network operator 208 (FIG. 2) may pre-provision each of its subscriber access terminals with a roaming IMSI that can be used for inter-standard roaming (e.g., obtaining network access through a roaming sponsor in a visited network that operates on a different communication protocol). Such roaming IMSI may be associated with a particular roaming sponsor with which the home network operator 208 has a roaming agreement. The home network operator 208 may provide such roaming IMSI to its subscriber access terminals while they operate in the home network. The home network operator 208 may also update such roaming IMSI if a new preferred roaming sponsor is selected by the home network operator while the access terminal operates in the home network 202. The roaming IMSI may be stored in the dual mode card for access terminal. Note that the dual mode card may store a plurality of roaming IMSIs which the access terminal can use when roaming in different types of networks. Additionally, a home network operator may rank the plurality of roaming IMSIs stored in a dual mode card so that the access terminal may use them in order of preference.

In some cases, it may be desirable to update the roaming IMSI for a subscriber access terminal while it is already operating in a visited network. Therefore, dynamic IMSI allocation may be performed when a subscriber of the home network performs inter-standard roaming. Referring again to FIG. 1 for example, upon roaming to the visited network 104 (e.g., a GSM network), the access terminal 108' may request service from this visited network 104 using its inter-standard IMSI (e.g., the IMSI assigned by the roaming sponsor/service provider). The visited network receives the service request and thinks the access terminal is from a particular roaming sponsor since the IMSI belongs to that roaming sponsor. In this example, roaming sponsor A 110 is the service provider for the roaming access terminal 108' in the visited network 104. Roaming sponsor A 110 knows that the inter-standard IMSI has been given to a subscriber access terminal 108' for the home network 102. Therefore, the visited network 104 routes location update, authentication, etc., to a Roaming Gateway 106 associated with the home network 102. The Roaming Gateway 106 relays all the requests to an Interoperability and Interworking Function (IIF) operating on the Roaming Gateway 106. The IIF facilitates communications between networks of different types (e.g., CDMA network and a GSM network).

According to one example, upon roaming to the visited network 104, the access terminal 108' may send a registration request that is forwarded to a Roaming Gateway 106 for the home network 102 (e.g., first network). The Roaming Gateway 206 may implement an Interoperability and Interworking Function (IIF). Generally, the IIF implements protocol conversion between the home network 102 (e.g., CDMA Mobile Application Part or MAP) and the visited network 104 (e.g., GSM MAP), thereby facilitating communications and/or signaling between the two networks 102 and 104. For instance, for a CDMA subscriber that roams into a GSM network (e.g., visited network 104), the IIF may act as the Home Location Register (HLR) and/or Authentication Center (AC) 124 in the GSM network (e.g., visited network 104) and a Visited Location Register (VLR) and/or Mobile Switching Center (MSC) 126 in the CDMA network (e.g., home network 102) for the subscriber access terminal 108'. A Home Location Register (HLR) is a database that contains semi-permanent mobile subscriber information for a wireless carriers' subscriber base. HLR subscriber information includes the International Mobile Subscriber Identity (IMSI), service subscription information, location information (e.g., the identity of the currently serving Visitor Location Register (VLR) to enable the routing of mobile-terminated calls), service restrictions and supplementary services information for each subscriber access terminal. A Visitor Location Register (VLR) is a database which contains temporary information concerning the mobile subscribers that are currently located in a given MSC serving area, but whose Home Location Register (HLR) is elsewhere.

Typically, the access terminal 108 includes the currently activated inter-standard IMSI which it uses during a registration process to identify itself to the network. An IMSI is a unique, non-dialable number allocated to each mobile subscriber that identifies the subscriber and his or her subscription within a particular network. The IMSI may reside in a Subscriber Identity Module (SIM), Removable User Identity Module (RUIM) or a dual-mode card that has both functions, which is housed within an access terminal. The IMSI may be made up of three parts (1) the mobile country code (MCC) consisting of three digits, (2) the Mobile Network Code (MNC) consisting of two digits, and (3) the Mobile Subscriber Identity Number (MSIN) with up to 10 digits.

In some cases, it may be desirable to change or update the roaming sponsor being used by the access terminal in a particular visited network. In some instances, a home network operator may have agreements with multiple service providers in other networks. In some cases, the home network operator may be able to select which of those service provides may act as a roaming sponsor for inter-standard roaming within a particular visited serving network. For example, within a visited network, two potential roaming sponsors (first roaming sponsor A 110 and second roaming sponsor B 112) may be available to a subscriber access terminal of the home network. The subscriber access terminal 108' may initially start using a first IMSI associated with roaming sponsor B 112 to obtain service in the visited serving network. For instance, the access terminal 108' may have been pre-configured to use a first inter-standard roaming IMSI associated with the roaming sponsor B 112. Thus, when the access terminal 108' enters the visited network 104, it sends a service request using the first inter-standard roaming IMSI.

However, the home network operator may prefer to use a different roaming sponsor (i.e., roaming sponsor A 110). For instance, if the terms (e.g., pricing, etc.) provided by the roaming sponsor A 110 are more favorable, the home network operator may initiate a change of the IMSI for that subscriber access terminal. That is, the home network operator may cause the roaming subscriber access terminal 108' to use a new IMSI associated with the preferred roaming sponsor A 110. Thus, the visited serving network 104 will now treat the subscriber access terminal 108' as a subscriber of the roaming sponsor A 110.

Upon recognizing that the access terminal 108' is in the visited network 104, the IIF in the Roaming Gateway 106 may determine that the roaming sponsor A 110 should be used to provide service to the access terminal 108'. However, the currently activated inter-standard IMSI (i.e., the first roaming IMSI) is from roaming sponsor B 112 and not from the preferred roaming sponsor A 110. Therefore, the IIF selects or generates a new inter-standard IMSI corresponding to the selected roaming sponsor A 110. The new IMSI associated with the preferred roaming sponsor A 110 is sent to the access terminal 108'. Upon receiving the selected new IMSI, the access terminal 108' updates its SIM card function in the dual-mode card with the new inter-standard IMSI. Consequently, the new inter-standard IMSI may replace, or be used instead of, the original first inter-standard IMSI. This may trigger a restart of the access terminal 108' such that the access terminal 108' initiates service via the selected roaming sponsor A 110.

According to one implementation, the Roaming Gateway 106 may rely on an Update Server 120 to provision the new IMSI for the selected roaming sponsor A 110. In some instances, the Update Server 120 may be co-located with the Roaming Gateway 106. In one example, the Update Server 120 may be coupled to a Card Database 122 that includes IMSI information for different types of networks and/or sponsors. Upon a request by the Roaming Gateway 106, the Update Server 120 may obtain, generate, and/or send the new inter-standard IMSI corresponding to the selected roaming sponsor 110 and/or the visited network 104. In some instances, a Subscriber Identity Module (SIM) Toolkit (STK) short message service (SMS) is utilized to send the second IMSI and update to the access terminal 108'.

Figure 3:
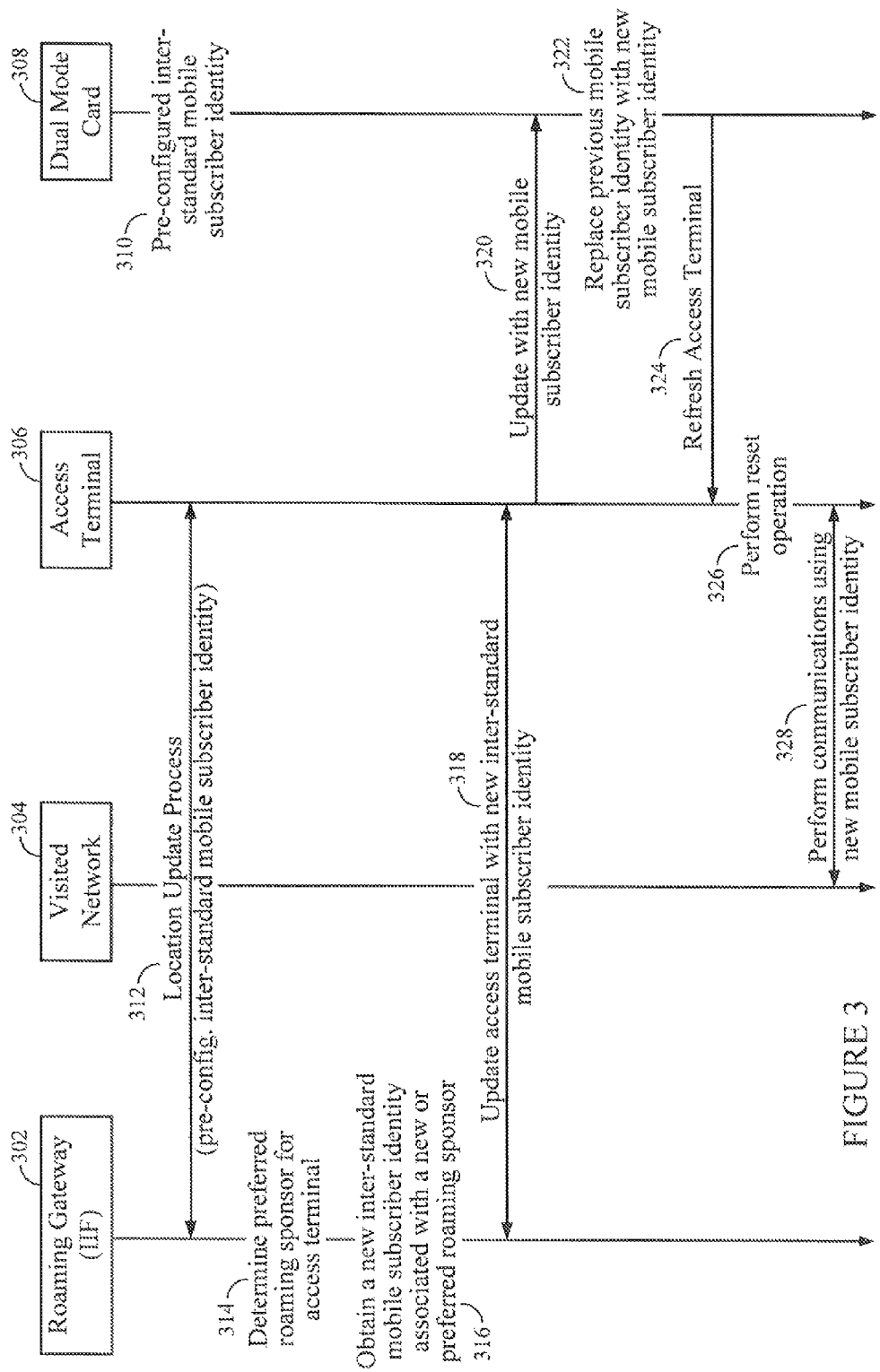
FIG. 3 illustrates a method for updating an access terminal when it roams into a visited network and attempts to register for service.

FIG. 3 illustrates a method for updating an inter-standard mobile identity (e.g., IMSI) in an access terminal when it roams into a visited network. The access terminal 306 may include a dual mode card 308 that has a current or pre-configured inter-standard mobile subscriber identity 310. The inter-standard mobile subscriber identity 310 is used by the access terminal 306 when it roams away from its home network into a visited network 304 which operates according to a different communication technology or protocol than the access terminal 306. The dual mode card 308 may be updated to replace the pre-configured (currently active) inter-standard mobile subscriber identity 310 with a new mobile subscriber identity (e.g., IMSI) for inter-standard roaming. When the access terminal 306 roams into a visited network 304, it may attempt to register with the visited network 304. As part of this registration process, the access terminal 306 may initiate a location update process 312 with a roaming gateway 302 (e.g., a general global gateway (GGG)) that implements an Interoperability and Interworking Function (IIF). During this location update process 312, the access terminal 306 may send a message (including the pre-configured inter-standard mobile subscriber identity 310) to its home network (not shown) that it has moved or roamed. The roaming gateway 302 may determine whether the access terminal 306 should use the pre-configured inter-standard mobile subscriber identity 310 or whether a new inter-standard mobile subscriber identity should be provided to the access terminal 306. For example, the pre-configured mobile subscriber identity 310 may be a first IMSI associated with a particular roaming sponsor. But the home network operator for the access terminal 306 may prefer a different roaming sponsor for the access terminal 306 in the visited network 304.

Thus, the roaming gateway 302 may determine that the pre-configured mobile subscriber identity for the access terminal should be replaced or updated with a new mobile subscriber identity associated with the preferred roaming sponsor. Consequently, the roaming gateway 302 obtains a new mobile subscriber identity associated with the new or preferred roaming sponsor 316. From the point of view of the serving visited network 304, the access terminal using the new mobile subscriber identity is treated as a subscriber of the preferred roaming sponsor.

The roaming gateway 302 then initiates an update process 318 with the access terminal 306 to send the new mobile subscriber identity. The access terminal 306 then updates 320 the dual mode card 308 with the new mobile subscriber identity. The dual mode card 308 replaces the previous or pre-configured mobile subscriber identity with the new mobile subscriber identity 322. That is, the new mobile subscriber identity is utilized by the dual mode card 308 to refresh the access terminal 306 communications over the visited network. To accomplish this, the dual mode card 308 may refresh the access terminal 324, which may cause the access terminal to perform a reset operation 326. The access terminal 306 may then perform communications on the visited network using the new mobile subscriber identity 328.

The access terminal 306, as part of the update process 318, may notify the roaming gateway 302 when the new mobile subscriber identity has been successfully updated by the dual mode card 308. Consequently, the roaming gateway 302 may update the current mobile subscriber identity for the access terminal 306.

In one example, the update or change of mobile subscriber identity is transparent to the user of the access terminal 306. So no direct action by the user of the access terminal is needed.

Note that the transmission of the new mobile subscriber identity may be secured using a key already known to the dual mode card 308. For example, a security key may have been previously established or negotiated between the access terminal 306 and the home network (e.g., HLR/AC 130 in FIG. 1). The roaming gateway 302 may obtain such previously established security key from the home network (e.g., HLR/AC 130 in FIG. 1). In one example, the inter-standard mobile subscriber identity is to be updated while the access terminal is operating within the home network. Therefore, the roaming gateway 302 may obtain such security key from the HLR/AC 130 by emulating it as a VLR 126. In another example, the inter-standard mobile subscriber identity is to be updated while the access terminal is operating within a visited network. Therefore, the roaming gateway 302 may obtain such security key from the second network's HLR/AC function 124 within it.

Figure 4:
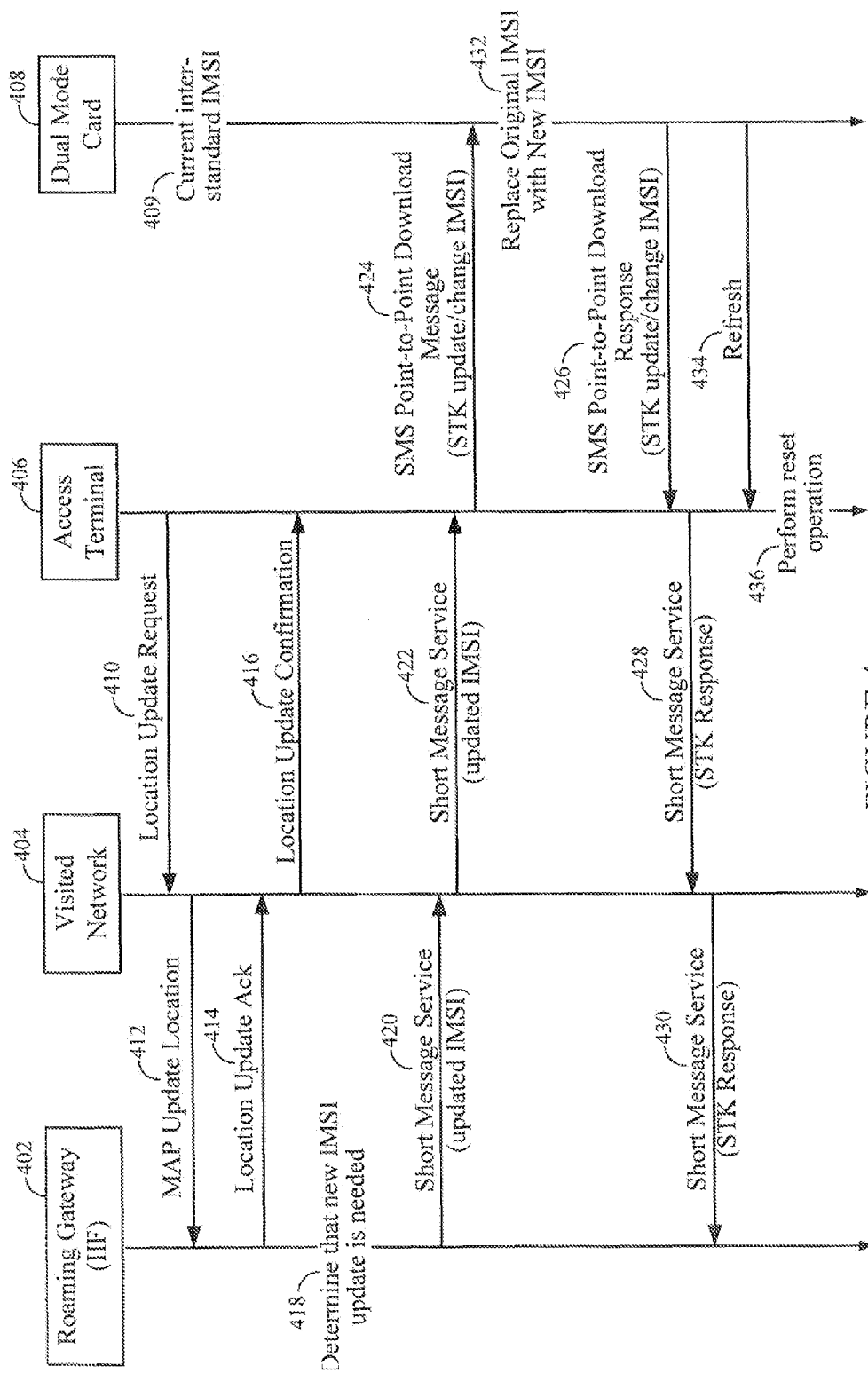
FIG. 4 illustrates a specific example for updating a mobile subscriber identity for an access terminal when it roams into a visited network and attempts to register for service.

FIG. 4 illustrates a specific example for updating a mobile subscriber identity for an access terminal when it roams into a visited network and attempts to register for service. The access terminal 406 may be a subscriber with a home network and has a current inter-standard IMSI 409 associated with the home network. In this example, the access terminal 406 may include a dual mode card 408 that may be updated with a new IMSI for inter-standard roaming. Upon roaming into a visited network 404, the access terminal 406 may attempt to register with the visited network 404 for service. The access terminal may generate a renewal position signal in the visiting network. That is, as part of a registration process, the access terminal 406 may send a Location Update Request 410 which passes through the visited network 404 and then to the Roaming Gateway 402 (e.g., a General Global Gateway (GGG)) that implements an Interoperability and Interworking Function (IIF). The Location Update Request 410/412 may include a serving network identifier and the current inter-standard IMSI 409 for the access terminal 406.

When the Location Update Request (e.g., position renewal signal) involves a Visitor Location Register (VLR) change, the visited network 404 sends a signal "MAP-Update Location" to the Home Location Register (HLR) for the access terminal 406. This signal is then passed to the roaming gateway 402 via a roaming sponsor. The signal "MAP-Update Location" may include the access terminal current IMSI information and a VLR serial number. In response, the IIF in the roaming gateway 402 (or other component of the home network) may send a location update acknowledgement 414/416 (forwarded via the visited network), which acknowledges an update in the home network for the location of the access terminal 406. For instance, the IIF in the roaming gateway 402 (e.g., operating as the subscriber HLR) carries out the position renewal operation, returns the signal "MAP-Update Location Ack". By presetting to a roaming country area (for example, according to VLR information) the roaming gateway 402 (IIF) can provide optimal GSM-network roaming sponsor allocation to access terminals.

Additionally, the roaming gateway 402 may confirm the IMSI information and then instructs the access terminal 406 and dual mode card 408 to carry out the IMSI update or change operation. The roaming gateway determines that a new IMSI update is needed 418. Where a plurality of roaming sponsors is available for the visited network 404, the IIF in the roaming gateway 402 may determine which roaming sponsor would be best for the access terminal 406. For instance, the IIF may select a roaming sponsor that provides better pricing for service to the home network of the access terminal 406, best services, or most robust coverage. In another example, the home network operator may define an order of preference or rank for which sponsor to use in which visited networks and provides this to the roaming gateway 402. The IIF can then determine whether the current inter-standard IMSI 409 for the access terminal 406 is associated with the preferred roaming sponsor. If the current inter-standard IMSI 409 is not associated with the preferred roaming sponsor for the visited network, the preferred roaming sponsor is selected. Once the preferred roaming sponsor is selected, the IIF may obtain a new subscriber identity (IMSI) corresponding to the selected roaming sponsor. This new subscriber identity (IMSI) may then be sent (e.g., via a short message service 420/422) to the access terminal 406 via the visited network 404.

In one example, a special SIM Tool Kit (STK) short message may be used to send the new IMSI from the roaming gateway 402 to the access terminal 406. The IIF in the roaming gateway 402 may implement an integrated Service Center and/or Short Messaging Service (SMS) Gateway Mobile Switch Center (GMSC) functions directly to transmit a "MAP-MT Forward Short Message" to the visited network 404. The short message may use an identifier (PID=0x7F) indicating a SIM Data Download. The short message ensures the safekeeping by a Secured Packet which carries security instructions. The Secured Packet payload may include a remote management instruction, and carries the related parameter, for example the instruction type ("change IMSI" or "increase IMSI") and to change the IMSI at the dual mode card 408. To avoid over-the-air transmission of a security key, the dual mode card 408 and roaming gateway 402 may share the identical security key. This does not reduce the security level, because the HLR function is performed by the IIF on the roaming gateway 402. The visited network 404 passes the STK short message from the roaming gateway 402 to the access terminal 406.

Upon receiving the new IMSI, the access terminal 406 may send a message 424 that eventually updates or changes the dual mode card 408 to use the new IMSI. Because the STK short message acts according to the instructions therein, the access terminal 406 forwards the short message instructions (e.g. through Envelop (SMS Point-to-Point Data Download) command) to the dual mode card 408.

Based on the received update/change IMSI message 424, the dual mode card 408 may replace the current inter-standard IMSI with the new IMSI 432. This may cause a restart or reset of the access terminal 406 such that wireless service is re-established using the selected roaming sponsor corresponding to the new IMSI. For instance, the dual mode card 408 may send a refresh message 434 to the access terminal 406 which causes the access terminal to perform a reset operation 436 to use the new IMSI.

Additionally, after the dual mode card 408 receives the STK short message 424, it may send a response 426 to the access terminal 406. Similarly, the access terminal 406 may send a response 428/430 which is forwarded to the roaming gateway 402, thereby acknowledging update/change of the IMSI by the dual mode card 408.

Exemplary Roaming Gateway

Figure 5:
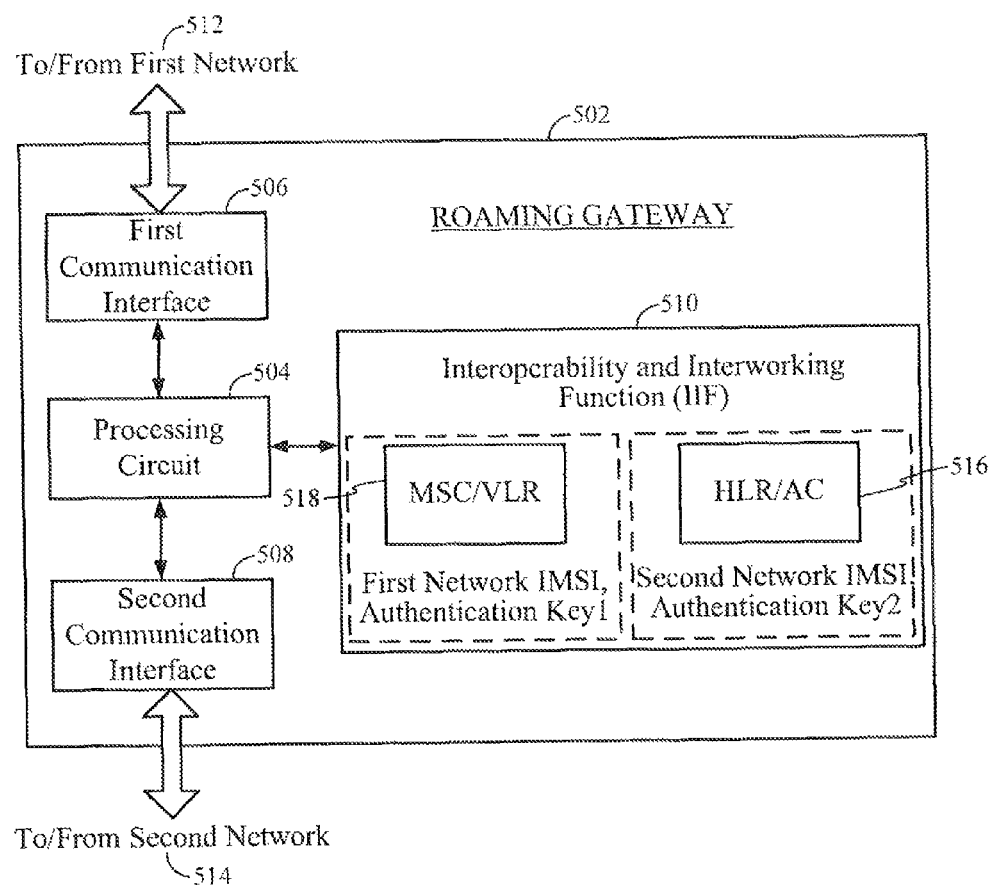
FIG. 5 is a block diagram illustrating an exemplary roaming gateway configured to facilitate the roaming of an access terminal from a first network into a second network.

FIG. 5 is a block diagram illustrating an exemplary roaming gateway configured to facilitate the inter-standard network roaming of an access terminal from a first network into a second network. The roaming gateway 502 may include a processing circuit 504 coupled to a first communication interface 506 and a second communication interface 508. The first communication interface 506 may allow the roaming gateway 502 to communicate over a first network 512. The second communication interface 508 may allow the roaming gateway 502 to communicate over a second network 514. The processing circuit 504 may implement an interoperability and interworking function (IIF) 510. For a subscriber access terminal of the first network 512 (e.g., home network 102 in FIG. 1) that roams into the second network 514 (e.g., visited network 104 in FIG. 1), the IIF 510 may act as a Home Location Register (HLR) and/or Authentication Center (AC) 516 in the second network 514 (e.g., visited network 104) and a Visited Location Register (VLR) and/or Mobile Switching Center (MSC) for the first network 512. For example, the HLR/AC 516 may perform the final authentication of a subscriber access terminal and records the serving VLR when the access terminal roams to the second network 514 (e.g. visited network). When there is an incoming call to the user's CDMA MDN (Mobile Directory Number) while the subscriber access terminal is in inter-standard roaming (i.e. when the user is using a GSM IMSI and the visited GSM network for communication), the call may be relayed to this MSC/VLR 518 and the MSC/VLR 518 then forwards the call to the second network 514 (e.g. visited network). The second network 514 then pages the subscriber access terminal and connects the call.

The roaming gateway 502 and IIF 510 may be adapted to allow an access terminal that subscribes to the first network 512, to roam (e.g., inter-standard roaming) into the visited network 514 while being allocated a roaming sponsor for the visited network 514. Since the second network 514 may be different than the first network 512 and multiple roaming sponsors may be available for the second network 514, an inter-standard mobile subscriber identity for the access terminal may be updated or changed with a new mobile subscriber identity for operation in the second network 514 via the roaming gateway 502. That is, the inter-standard mobile subscriber identity (e.g., IMSI) from the subscriber access terminal may be updated or replaced so that a preferred roaming sponsor (from the multiple available roaming sponsors) is used in the second network 514.

Figure 6:
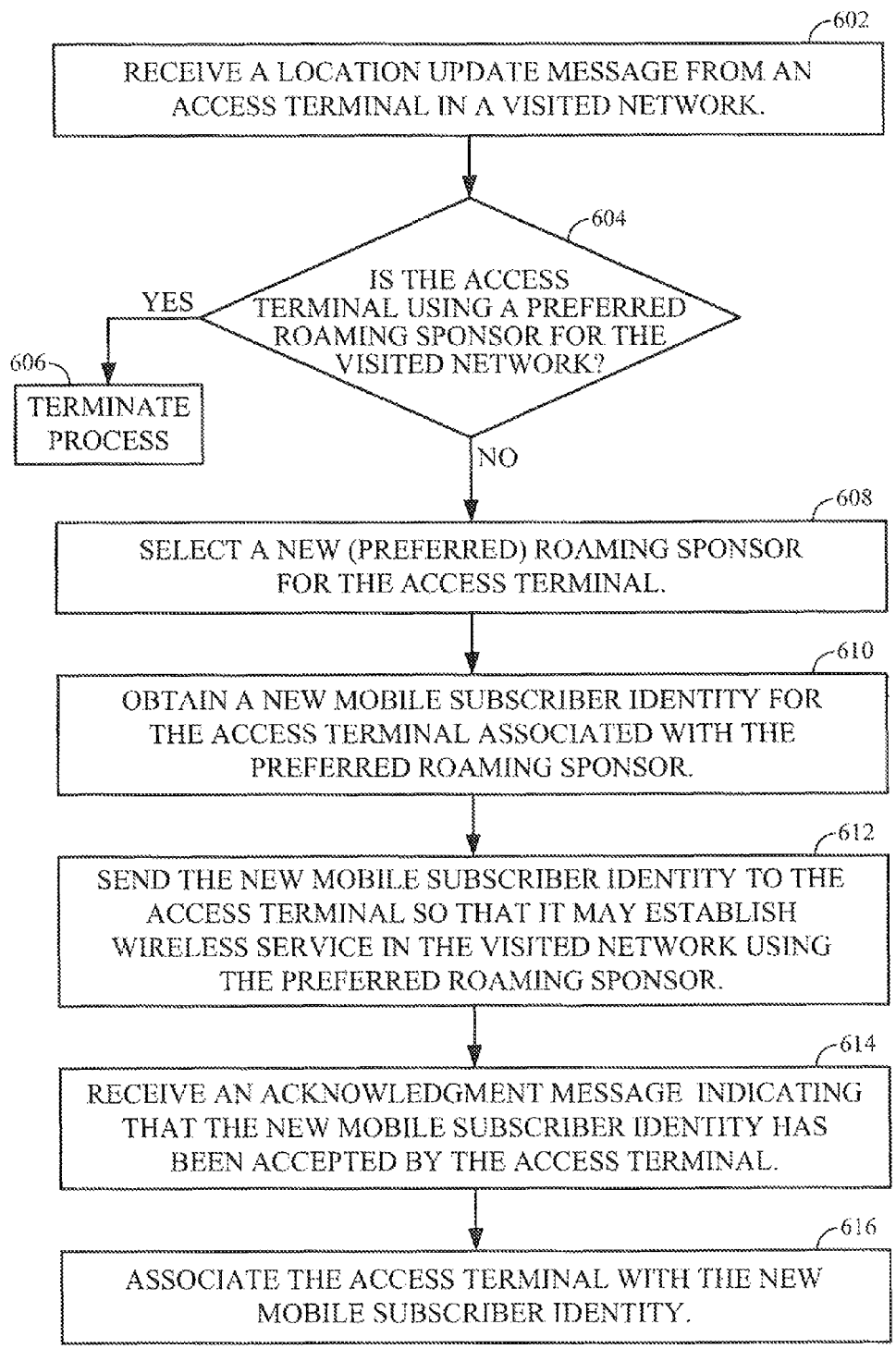
FIG. 6 illustrates a method operational on a roaming gateway to facilitate inter-standard roaming operations of an access terminal.

FIG. 6 illustrates a method operational on a roaming gateway to facilitate inter-standard roaming operations of an access terminal. The roaming gateway may receive a location update message from an access terminal that has roamed into a visited network 602. The location update message may be part of a registration process in which the access terminal registers with the visited network. The location update message may include a currently activated mobile subscriber identity (e.g., a mobile identifier or IMSI) that is uniquely associated with the access terminal and the currently used roaming sponsor. The currently activated mobile subscriber identity may reside in a Subscriber Identity Module (SIM), which is housed within an access terminal, and may be made up of at least a mobile network identifier and a subscriber identifier.

The roaming gateway may determine whether the access terminal is using the preferred roaming sponsor for the visited network 604 or visited region. For example, the currently activated mobile subscriber identity may be received in the location message and is utilized to determine if the access terminal is associated with the preferred roaming sponsor in the visited network or visited region. If the access terminal is already using the preferred roaming sponsor (i.e. the currently activated mobile subscriber identity is associated with the preferred roaming sponsor), the process is terminated 606. Otherwise, the roaming gateway may select a new roaming sponsor (e.g., the preferred roaming sponsor) for the access terminal 608. For example, the roaming sponsor may be a service provider in the visited network that may have a pre-established service agreement with the home network operator for the subscriber access terminal. The roaming gateway may then select a new mobile subscriber identity for the access terminal, where the new mobile subscriber identity is associated with the preferred roaming sponsor 610. The new mobile subscriber identity is then sent to the access terminal so that it may establish wireless service via the visited network using the preferred roaming sponsor 612.

The roaming gateway may receive an acknowledgement message indicating that the new mobile subscriber identity has been accepted by the access terminal 614. The roaming gateway then associates the access terminal with the new mobile subscriber identity 616.

The roaming gateway may utilize a short message service to transmit the new mobile subscriber identity to the access terminal. The transmission of the new mobile subscriber identity may be secured using a pre-established key. For example, a GSM authentication key Ki may have been previously established. Such authentication key may be obtained by the roaming gateway from the home network.

In some implementations, a similar process as illustrated in FIG. 6 may be performed by a roaming gateway to update an access terminal with a new inter-standard mobile subscriber identity while it is still operating in its home network. The roaming gateway may receive an instruction from the home network operator to update, change, or switch the mobile subscriber identities of one or more subscriber access terminals. Therefore, the roaming gateway may send one or more messages or instructions to one or more subscriber access terminals (operating in the home network and/or visited network) to update, change, or switch their inter-standard mobile subscriber identities.

Exemplary Access Terminal

Figure 7:
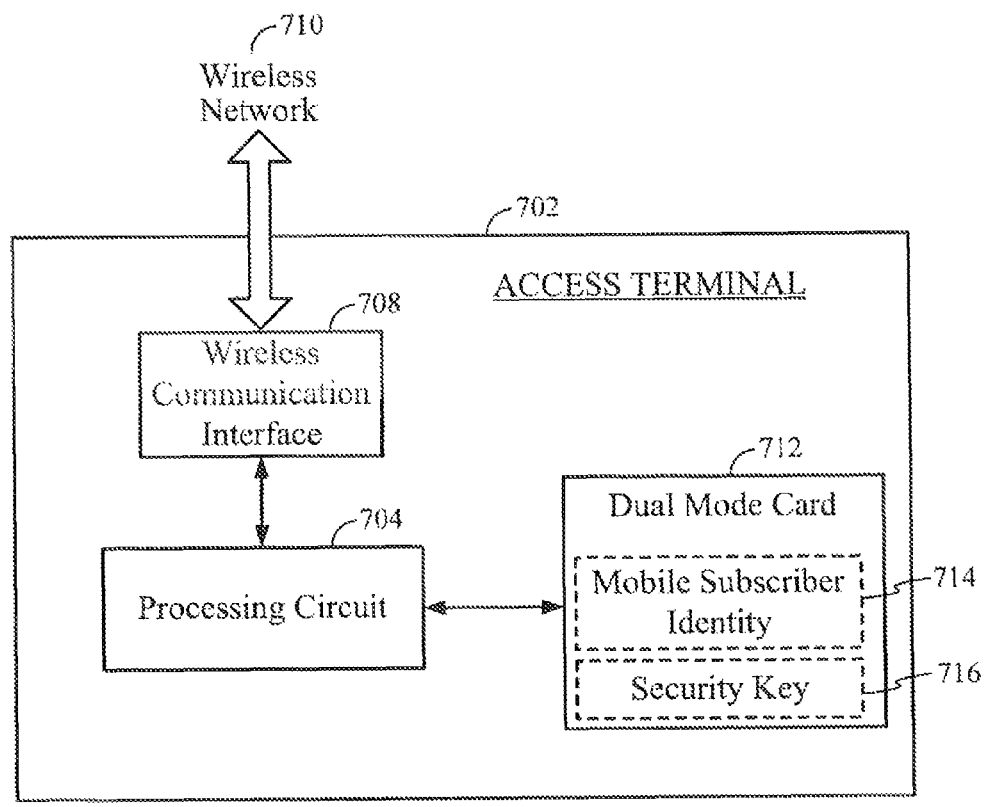
FIG. 7 is a block diagram illustrating an exemplary access terminal configured to facilitate the inter-standard network roaming.

FIG. 7 is a block diagram illustrating an exemplary access terminal configured to facilitate the inter-standard network roaming. The access terminal 702 may include a processing circuit 704 coupled to a wireless communication interface 708 that may include a transmitter and/or receiver that allows the access terminal to communicate over one or more wireless networks 710. In one example, the wireless communication interface 708 may permit dual mode or multi-mode operation, allowing the access terminal to communicate over different wireless networks (e.g., GSM, CDMA, etc.). The access terminal 702 may also receive or house a dual mode card 712 (e.g., subscriber identity module) that stores information for allowing the access terminal 702 to communicate over one or more wireless networks. The dual mode card 712 may store information, such as a mobile subscriber identity 714 and/or a security key 716 that may be used to authenticate the access terminal or user of the access terminal as a subscriber of a particular wireless network.

Figure 8:
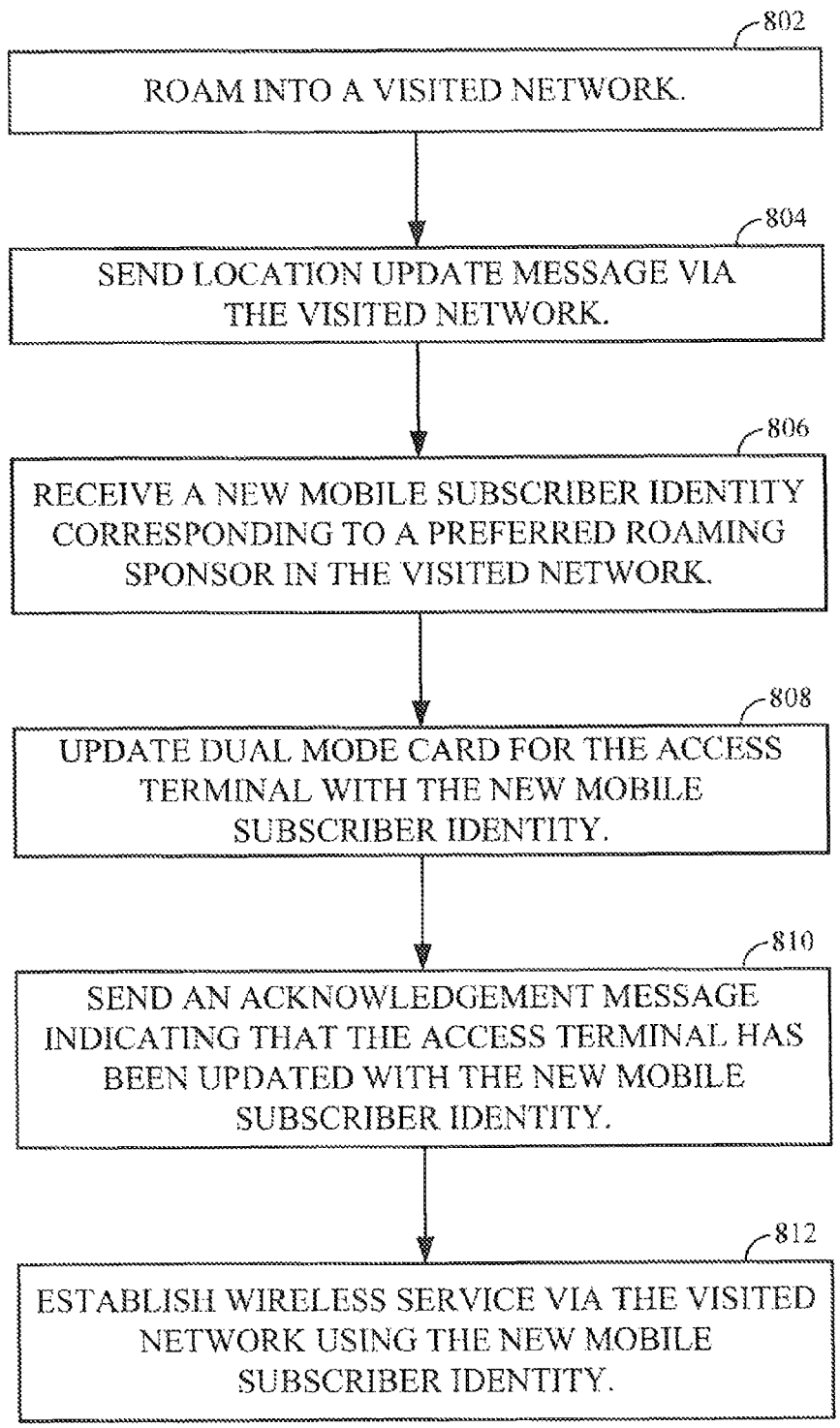
FIG. 8 illustrates a method operational on an access terminal to operate while performing inter-standard roaming.

FIG. 8 illustrates a method operational on an access terminal to operate while performing inter-standard network roaming. During operation, the access terminal may roam into a visited network 802. Such visited network may be of a different type than a home network in which the access terminal is subscribed. For example, the home network may operate according to a first communication standard with the second network may operate according to a second communication standard. In some implementations, the access terminal may be pre-provisioned with a currently activated inter-standard mobile subscriber identity that is associated with a particular roaming sponsor. The access terminal may send a location update message via the visited network 804. The location update message may include the currently activated inter-standard mobile subscriber identity (e.g., GSM IMSI) for the access terminal. If the currently activated mobile subscriber identity does not correspond to a preferred roaming sponsor for the visited network, the access terminal may receive a new mobile subscriber identity (e.g., a new GSM IMSI) corresponding to the preferred roaming sponsor in the visited network 806. The access terminal may then update its dual mode card (e.g., subscriber information module (SIM)) using the new mobile subscriber identity 808. The access terminal may also send an acknowledgement message indicating that the access terminal has been updated with the new mobile subscriber identity 810. The access terminal may then establish wireless service via the visited network using the new mobile subscriber identity 812. Because the new mobile subscriber identity is associated with the preferred roaming sponsor, the visited network operator will treat the access terminal as a subscriber of the roaming sponsor.

In some instances, the access terminal may have been pre-provisioned with multiple inter-standard mobile subscriber identities, each associated with a different roaming sponsor. Therefore, the roaming gateway may merely indicate that the access terminal should switch to a different inter-standard mobile subscriber identity from the pre-provisioned with multiple inter-standard mobile subscriber identities.

Note that the new mobile subscriber identity may be received via a short message service in a secure packet or message. The secure message may encapsulate instructions to the dual mode card that instruct the dual mode card to replace, switch, increase, or modify its mobile subscriber identity stored therein for inter-standard roaming. The dual mode card may decrypt the secure message and performs the instructions indicted therein to replace, switch, increase, or modify its mobile subscriber identity with the new mobile subscriber identity.

In some implementations, a similar process as illustrated in FIG. 8 may be performed to update an access terminal with a new inter-standard mobile subscriber identity while it is still operating in its home network.

The various illustrative logical blocks, modules and circuits and algorithm steps described herein may be implemented or performed as electronic hardware, software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. It is noted that the configurations may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

When implemented in hardware, various examples may employ a general purpose processor, a digital signal processor (DSP), an application specific integrated circuit (ASIC), a field, programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

When implemented in software, various examples may employ firmware, middleware or microcode. The program code or code segments to perform the necessary tasks may be stored in a machine-readable or computer-readable medium such as a storage medium or other storage(s). One or more processors may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In one or more examples herein, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media. Software may comprise a single instruction, or many instructions, and may be distributed over several different code segments, among different programs and across multiple storage media. An exemplary storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is required for proper operation of the embodiment that is being described, the order and/or use of specific steps and/or actions may be modified without departing from the scope of the claims.

One or more of the components, steps, and/or functions illustrated in the Figures may be rearranged and/or combined into a single component, step, or function or embodied in several components, steps, or functions without the features described herein. Additional elements, components, steps, and/or functions may also be added without departing from the invention. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a roaming gateway for facilitating inter-standard network roaming, comprising:
   receiving a location update message from an access terminal that is performing inter-standard network roaming into a visited network, wherein the location update message includes a currently activated mobile subscriber identity for the access terminal;
   determining, at the roaming gateway, whether a current roaming sponsor for the access terminal is a preferred roaming sponsor in the visited network from among a plurality of available roaming sponsors;
   determining whether the access terminal is using the preferred roaming sponsor for the visited network from among the plurality of available roaming sponsors based on the currently activated mobile subscriber identity;
   obtaining, at the roaming gateway, a new mobile subscriber identity for the access terminal if the current roaming sponsor is not the preferred roaming sponsor from among the plurality of available roaming sponsors, where the new mobile subscriber identity is associated with the preferred roaming sponsor; and
   sending the new mobile subscriber identity to the access terminal so that it can establish wireless service in the visited network using the preferred roaming sponsor.

2. The method of claim 1, wherein the new mobile subscriber identity is associated with a network type and a mobile subscriber identity number.

3. The method of claim 1, wherein the new mobile subscriber identity is an international mobile subscriber identity (IMSI).

4. The method of claim 1, wherein the visited network implements a different communication standard than a home network for the access terminal.

5. The method of claim 1, wherein the new mobile subscriber identity is obtained if the currently activated mobile subscriber identity is not associated with the preferred roaming sponsor for the visited network.

6. The method of claim 1, further comprising: determining whether the access terminal is using the preferred roaming sponsor from among the plurality of available roaming sponsors based on at least one of a currently serving visitor location register identity or a mobile switching center identity.

7. The method of claim 1, further comprising:
   receiving an acknowledgment message from the access terminal indicating that the new mobile subscriber identity has been accepted by the access terminal; and
   associating the access terminal with the new mobile subscriber identity.

8. The method of claim 1, wherein the preferred roaming sponsor is selected by the roaming gateway from among the plurality of available roaming sponsors in the visited network.

9. The method of claim 1, wherein the preferred roaming sponsor and at least one other available roaming sponsor have pre-established roaming agreements with a home service provider for the access terminal.

10. The method of claim 1, wherein the new mobile subscriber identity is sent in an update message via a short message service.

11. The method of claim 10, wherein the new mobile subscriber identity in the update message is secured by at least one of either a pre-established authentication key or derived key.

12. The method of claim 10, wherein the update message includes instructions to change a currently activated mobile subscriber identity for the access terminal.

13. The method of claim 1, wherein the access terminal roams from a home network into the visited network, where the home network is a Code Division Multiple Access (CDMA) network and the visited network is a Global System for Mobile Communication network, or vice versa.

14. The method of claim 1, wherein the access terminal roams from a home network into the visited network, where the home network is a Code Division Multiple Access (CDMA) network and the visited network is a Wide Code Multiple Access (CDMA) network, or vice versa.

15. A roaming gateway adapted to facilitate inter-standard network roaming, comprising:
   a communication interface to communicate with a wireless network; and
   a processing circuit coupled to the communication interface and adapted to:
   receive a location update message from an access terminal that is performing inter-standard network roaming from a home network to a visited network, wherein the location update message includes a currently activated mobile subscriber identity for the access terminal;

determine whether a current roaming sponsor for the access terminal is a preferred roaming sponsor in the visited network from among a plurality of available roaming sponsors;

determining whether the access terminal is using the preferred roaming sponsor for the visited network from among the plurality of available roaming sponsors based on the currently activated mobile subscriber identity;

obtain a new mobile subscriber identity for the access terminal if the current roaming sponsor is not the preferred roaming sponsor from among the plurality of available roaming sponsors, where the new mobile subscriber identity is associated with the preferred roaming sponsor; and send the new mobile subscriber identity to the access terminal so that it can establish wireless service in the visited network using the preferred roaming sponsor.

16. The roaming gateway of claim 15, wherein the processing circuit implements an interoperability and interworking function that allows access terminals adapted to communicate over a first type of network to communicate over the visited network.

17. The roaming gateway of claim 15, wherein the new mobile subscriber identity is obtained if the currently activated mobile subscriber identity is not associated with the preferred roaming sponsor for the visited network.

18. The roaming gateway of claim 15, wherein the visited network implements a different communication standard than a home network for the access terminal.

19. The roaming gateway of claim 15, wherein the processing circuit is further adapted to:

receive an acknowledgment message from the access terminal indicating that the new mobile subscriber identity has been accepted by the access terminal; and associate the access terminal with the new mobile subscriber identity.

20. A roaming gateway adapted to facilitate inter-standard network roaming, comprising:

means for receiving a location update message from an access terminal that is performing inter-standard network roaming from a home network to a visited network, wherein the location update message includes a currently activated mobile subscriber identity for the access terminal;

means for determining whether a current roaming sponsor for the access terminal is a preferred roaming sponsor in the visited network from among a plurality of available roaming sponsors;

means for determining whether the access terminal is using the preferred roaming sponsor for the visited network from among the plurality of available roaming sponsors based on the currently activated mobile subscriber identity;

means for obtaining a new mobile subscriber identity for the access terminal if the current roaming sponsor is not the preferred roaming sponsor from among the plurality of available roaming sponsors, where the new mobile subscriber identity is associated with the preferred roaming sponsor; and means for sending the new mobile subscriber identity to the access terminal so that it may establish wireless service in the visited network using the preferred roaming sponsor.

21. A non-transitory machine-readable medium comprising instructions operational in a roaming gateway for facilitating inter-standard network roaming, which when executed by one or more processors causes the processors to:

receive, at the roaming gateway, a location update message from an access terminal that is performing inter-standard network roaming from a home network to a visited network, wherein the location update message includes a currently activated mobile subscriber identity for the access terminal;

determine, at the roaming gateway, whether a current roaming sponsor for the access terminal is a preferred roaming sponsor in the visited network from among a plurality of available roaming sponsors;

determine whether the access terminal is using the preferred roaming sponsor for the visited network from among the plurality of available roaming sponsors based on the currently activated mobile subscriber identity;

obtaining a new mobile subscriber identity for the access terminal if the current roaming sponsor is not the preferred roaming sponsor from among the plurality of available roaming sponsors, where the new mobile subscriber identity is associated with the preferred roaming sponsor; and sending the new mobile subscriber identity to the access terminal so that it can establish wireless service in the visited network using the preferred roaming sponsor.

22. A method operational on an access terminal, comprising:

sending a location update message upon inter-standard network roaming into a visited network, wherein the location update message includes a currently activated mobile subscriber identity for the access terminal and the access terminal is associated with a current roaming sponsor selected from among a plurality of available roaming sponsors in the visited network;

receiving a new mobile subscriber identity associated with a preferred roaming sponsor selected from among the plurality of available roaming sponsors in the visited network, as determined by a roaming gateway based on the currently activated mobile subscriber identity, if the current roaming sponsor is not the preferred roaming sponsor; and updating a dual mode card for the access terminal with the new mobile subscriber identity.

23. The method of claim 22, further comprising:

sending an acknowledgement message indicating that the access terminal has been updated with the new mobile subscriber identity.

24. The method of claim 22, further comprising:

establishing wireless service via the visited network using the new mobile subscriber identity.

25. The method of claim 22, wherein the new mobile subscriber identity is associated with a network type and a mobile subscriber identity number.

26. The method of claim 22, wherein the location update message includes a currently activated mobile subscriber identity for the access terminal.

27. The method of claim 26, wherein the visited network implements a different communication standard than a home network for the access terminal.

28. The method of claim 22, wherein the new mobile subscriber identity is received in an update message from a roaming gateway and the new mobile subscriber identity is secured with at least one of either a pre-established authentication key or a derived key for the access terminal.

29. The method of claim 22, wherein the new mobile subscriber identity is received in an update message from a roaming gateway, and the update message includes instructions to change to the new mobile subscriber identity.

30. The method of claim 22, further comprising:
sending the new mobile subscriber identity to the dual mode card for the access terminal; and
receiving a signal from the dual mode card indicating to reset the access terminal to operate with the new mobile subscriber identity.

31. The method of claim 22, wherein the preferred roaming sponsor and at least one other available roaming sponsor are one of either a service provider in the visited network or a third party that has a roaming agreement with the service provider in the visited network.

32. The method of claim 22, wherein updating the dual mode card for the access terminal with the new mobile subscriber identity includes replacing a previous mobile subscriber identity wherein only one mobile subscriber identity is maintained by the dual mode card.

33. An access terminal adapted for inter-standard network roaming, comprising:
a communication interface to communicate with a wireless network; and
a processing circuit coupled to the communication interface and adapted to:
send a location update message upon inter-standard network roaming into a visited network, wherein the location update message includes a currently activated mobile subscriber identity for the access terminal and the access terminal is associated with a current roaming sponsor selected from among a plurality of available roaming sponsors in the visited network;
receive a new mobile subscriber identity associated with a preferred roaming sponsor selected from among the plurality of available roaming sponsors in the visited network, as determined by a roaming gateway based on the currently activated mobile subscriber identity, if the current roaming sponsor is not the preferred roaming sponsor; and
update a dual mode card for the access terminal with the new mobile subscriber identity.

34. The access terminal of claim 33, wherein the processing circuit is further adapted to:
establish wireless service via the visited network using the new mobile subscriber identity.

35. The access terminal of claim 33, wherein the location update message includes a currently activated mobile subscriber identity for the access terminal and the currently activated mobile subscriber identity is not associated with the preferred roaming sponsor for the visited network.

36. The access terminal of claim 33, wherein the processing circuit is further adapted to:
send the new mobile subscriber identity to the dual mode card for the access terminal; and
receive a signal from the dual mode card indicating to reset the access terminal to operate with the new mobile subscriber identity.

37. An access terminal adapted for inter-standard network roaming, comprising:
means for sending a location update message upon inter-standard network roaming into a visited network, wherein the location update message includes a currently activated mobile subscriber identity for the access terminal and the access terminal is associated with a current roaming sponsor selected from among a plurality of available roaming sponsors within the visited network;
means for receiving a new mobile subscriber identity associated with a preferred roaming sponsor selected from among the plurality of available roaming sponsors in the visited network, as determined by a roaming gateway based on the currently activated mobile subscriber identity, if the current roaming sponsor is not the preferred roaming sponsor; and
means for updating a dual mode card for the access terminal with the new mobile subscriber identity.

38. The access terminal of claim 37, further comprising:
means for establishing wireless service via the visited network using the new mobile subscriber identity.

39. The access terminal of claim 37, further comprising:
means for sending the new mobile subscriber identity to the dual mode card for the access terminal; and
means for receiving a signal from the dual mode card indicating to reset the access terminal to operate with the new mobile subscriber identity.

40. A non-transitory machine-readable medium comprising instructions operational in an access terminal for facilitating inter-standard network roaming, which when executed by one or more processors causes the processors to:
send a location update message upon inter-standard network roaming into a visited network, wherein the location update message includes a currently activated mobile subscriber identity for the access terminal and the access terminal is associated with a current roaming sponsor selected from among a plurality of available roaming sponsors within the visited network;
receive a new mobile subscriber identity associated with a preferred roaming sponsor selected from among the plurality of available roaming sponsors in the visited network, as determined by a roaming gateway based on the currently activated mobile subscriber identity, if the current roaming sponsor is not the preferred roaming sponsor; and
update a dual mode card for the access terminal with the new mobile subscriber identity.

* * * * *